(12) United States Patent
Raml

(10) Patent No.: US 11,028,542 B2
(45) Date of Patent: *Jun. 8, 2021

(54) PORTABLE WINDBREAK SHELTER ASSEMBLY

(71) Applicant: Charles H. Raml, Watertown, SD (US)

(72) Inventor: Charles H. Raml, Watertown, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,010

(22) Filed: Nov. 6, 2019

(65) Prior Publication Data

US 2020/0068843 A1 Mar. 5, 2020

Related U.S. Application Data

(63) Continuation of application No. 15/865,332, filed on Jan. 9, 2018, now Pat. No. 10,499,612.

(51) Int. Cl.
| | |
|---|---|
| *E04H 15/34* | (2006.01) |
| *E04H 15/54* | (2006.01) |
| *E04H 15/56* | (2006.01) |
| *E04H 15/58* | (2006.01) |
| *E04H 15/60* | (2006.01) |
| *A01K 1/00* | (2006.01) |
| *E01F 7/02* | (2006.01) |
| *E04B 1/343* | (2006.01) |
| *E04H 1/12* | (2006.01) |
| *E04B 7/02* | (2006.01) |
| *E04H 5/08* | (2006.01) |
| *E04B 1/00* | (2006.01) |

(52) U.S. Cl.
CPC ............ *E01F 7/025* (2013.01); *A01K 1/0035* (2013.01); *E04B 1/34336* (2013.01); *E04B 7/022* (2013.01); *E04H 1/1205* (2013.01); *E04H 5/08* (2013.01); *E04B 2001/0069* (2013.01); *Y10S 52/17* (2013.01)

(58) Field of Classification Search
CPC .......... E01F 7/025; A04H 5/08; A01K 1/0035
USPC ..... 52/90.1, 122.1, 143, 79.9, 79.12; 135/97
See application file for complete search history.

(56) References Cited

U.S. PATENT DOCUMENTS

| | | | | |
|---|---|---|---|---|
| 391,442 A | * | 10/1888 | Welburn ................. | E04B 1/344 |
| | | | | 52/71 |
| 1,750,026 A | * | 3/1930 | Rowe ................... | A01K 1/0218 |
| | | | | 119/446 |
| 2,712,677 A | | 7/1955 | Hyde | |

(Continued)

FOREIGN PATENT DOCUMENTS

| | | | | |
|---|---|---|---|---|
| CN | 106948283 A | * | 7/2017 | ................ E01F 7/02 |
| DE | 2604948 A1 | * | 8/1977 | ................ E04B 1/14 |

*Primary Examiner* — Robert Canfield

(57) ABSTRACT

A portable windbreak shelter assembly provides a combination shelter and windbreak which can be moved to a desired position using conventional vehicles typically available on a farm includes a shelter frame having a front, a back, a bottom face, a first lateral side face, and a second lateral side face. The first lateral side face and the second lateral side face extend upwardly from respective opposite edges of the bottom face and meet to define an apex of the shelter frame extending between the front and the back. A covering is coupled to the shelter frame wherein the covering and the shelter frame inhibit wind from passing through the shelter frame to define a sheltered interior space. The shelter frame is movable using conventional farm equipment.

18 Claims, 5 Drawing Sheets

(56) References Cited

U.S. PATENT DOCUMENTS

| | | | | |
|---|---|---|---|---|
| 2,963,122 A * | 12/1960 | Jagemann | ............ | G07F 19/201 |
| | | | | 52/66 |
| 3,063,104 A * | 11/1962 | Troxel | ................ | E04B 1/34326 |
| | | | | 454/245 |
| 3,190,404 A * | 6/1965 | Greulich | .................. | E04B 1/08 |
| | | | | 52/90.1 |
| 3,193,973 A * | 7/1965 | Reuscher | ................ | E04B 1/35 |
| | | | | 52/745.14 |
| 3,283,693 A * | 11/1966 | Howell | ..................... | E04H 1/02 |
| | | | | 454/186 |
| 3,442,057 A | 5/1969 | Derr | | |
| 3,460,297 A * | 8/1969 | Fritz | ........................ | E04H 1/02 |
| | | | | 52/66 |
| 3,464,167 A * | 9/1969 | Mason | ..................... | E04B 7/20 |
| | | | | 52/22 |
| 3,862,526 A | 1/1975 | Loughlin | | |
| 3,942,290 A * | 3/1976 | O'Sheeran | ............ | E04B 1/6137 |
| | | | | 52/57 |
| 3,990,197 A * | 11/1976 | Johnston | ............. | E04B 1/34838 |
| | | | | 52/125.2 |
| 4,112,633 A * | 9/1978 | Mitchell | ................. | E04G 21/28 |
| | | | | 52/66 |
| D263,818 S * | 4/1982 | Porter | ........................ | D12/103 |
| D267,904 S | 2/1983 | Hampel | | |
| 4,467,585 A | 8/1984 | Busby | | |
| D320,479 S * | 10/1991 | Cheval | ............................ | D25/1 |
| 5,193,325 A | 3/1993 | Allison | | |
| 5,394,897 A * | 3/1995 | Ritchey | .................. | E04H 15/18 |
| | | | | 135/117 |
| 5,473,845 A * | 12/1995 | Livingston | ........... | E04B 1/3483 |
| | | | | 211/194 |
| 5,921,034 A * | 7/1999 | Tobin | .................... | E04H 1/1205 |
| | | | | 52/122.1 |
| 6,408,796 B1 | 6/2002 | Hampel | | |
| 6,823,639 B2 | 11/2004 | Hampel | | |
| 8,141,517 B2 | 3/2012 | Shimoda | | |
| 8,769,886 B2 * | 7/2014 | Ohnishi | .............. | E04B 1/34869 |
| | | | | 52/79.12 |
| 8,978,320 B2 * | 3/2015 | Johnson | ................... | E04H 5/08 |
| | | | | 52/79.9 |
| 9,194,090 B2 * | 11/2015 | Raml | ...................... | E01F 7/025 |
| 9,470,010 B2 * | 10/2016 | Youn | ....................... | E04H 15/18 |
| 10,499,612 B2 * | 12/2019 | Raml | .................... | A01K 1/0035 |
| 10,753,118 B2 * | 8/2020 | Vesper | .................. | E04H 15/18 |
| 2005/0189009 A1* | 9/2005 | Walter | .................... | E04H 15/32 |
| | | | | 135/97 |
| 2009/0022552 A1* | 1/2009 | Berenyi | .................. | E01F 7/025 |
| | | | | 405/302.6 |
| 2013/0263528 A1* | 10/2013 | Johnson | ................... | E04H 7/22 |
| | | | | 52/79.9 |
| 2015/0240432 A1* | 8/2015 | Raml | ...................... | E01F 7/025 |
| | | | | 256/31 |
| 2017/0247898 A1* | 8/2017 | Nelson | .................... | A01F 25/04 |

* cited by examiner

PORTABLE WINDBREAK SHELTER ASSEMBLY

CROSS-REFERENCE TO RELATED APPLICATIONS

This application is a continuation of U.S. patent application Ser. No. 15/865,332 filed on Jan. 9, 2018.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to shelter devices and more particularly pertains to a new shelter device for providing a combination shelter and windbreak which can be moved to a desired position using conventional vehicles typically available on a farm.

BRIEF SUMMARY OF THE INVENTION

An embodiment of the disclosure meets the needs presented above by generally comprising a shelter frame having a front, a back, a bottom face, a first lateral side face, and a second lateral side face. The first lateral side face and the second lateral side face extend upwardly from respective opposite edges of the bottom face and meet to define an apex of the shelter frame extending between the front and the back. A covering is coupled to the shelter frame wherein the covering and the shelter frame inhibit wind from passing through the shelter frame to define a sheltered interior space. The shelter frame is movable using conventional farm equipment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
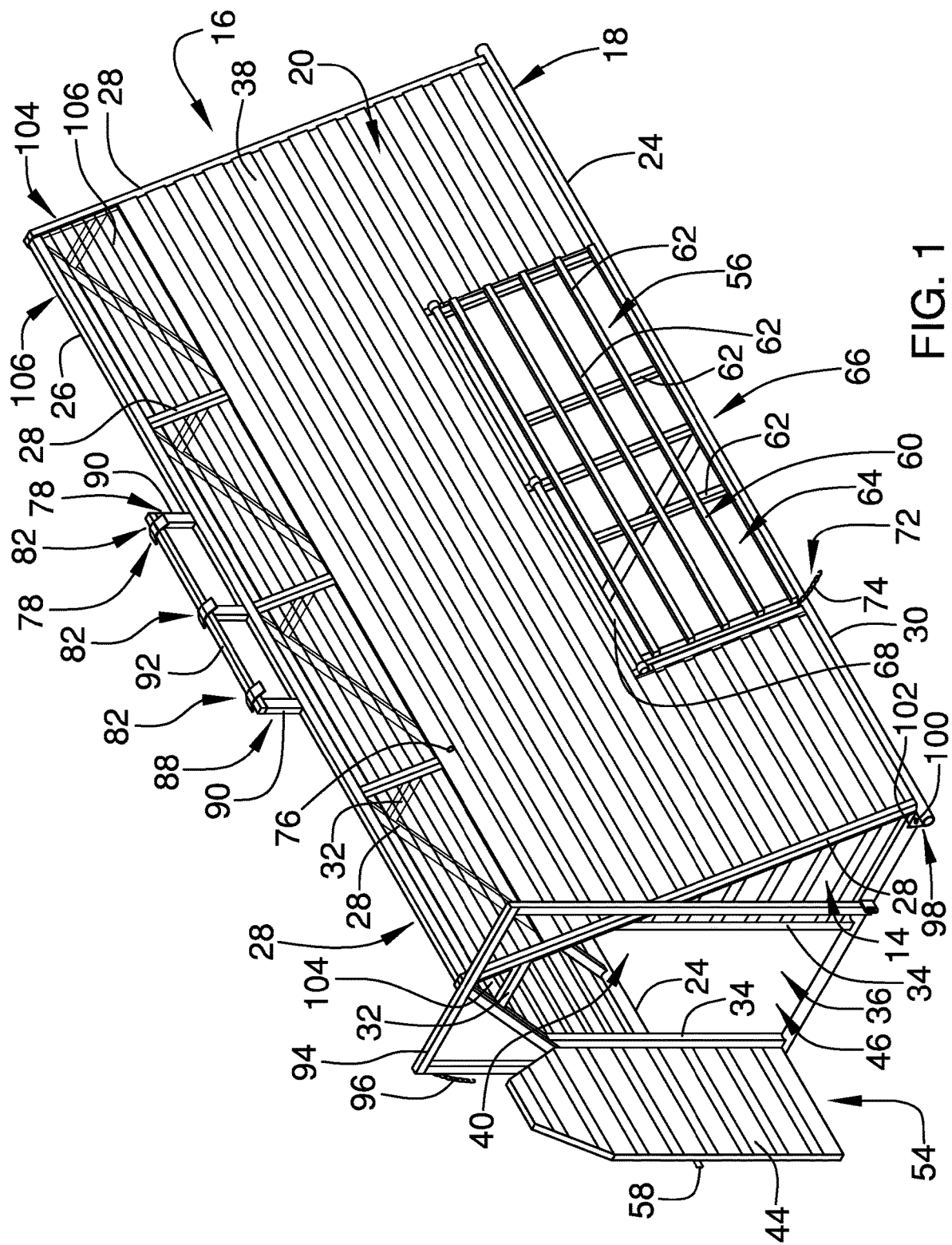
FIG. 1 is a top front side perspective view of a portable windbreak shelter assembly according to an embodiment of the disclosure.
Figure 2:
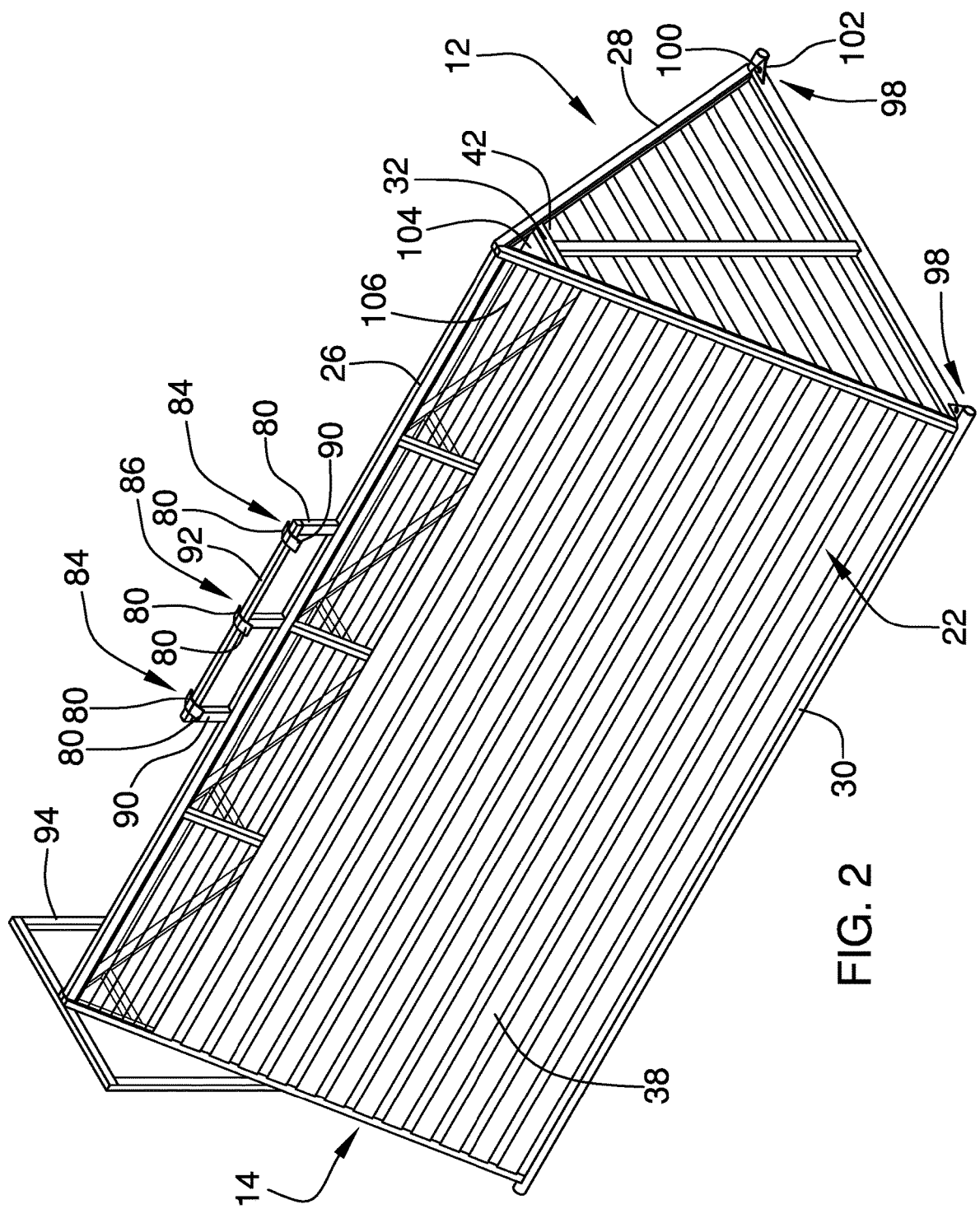
FIG. 2 is a top rear side perspective view of an embodiment of the disclosure.
Figure 3:
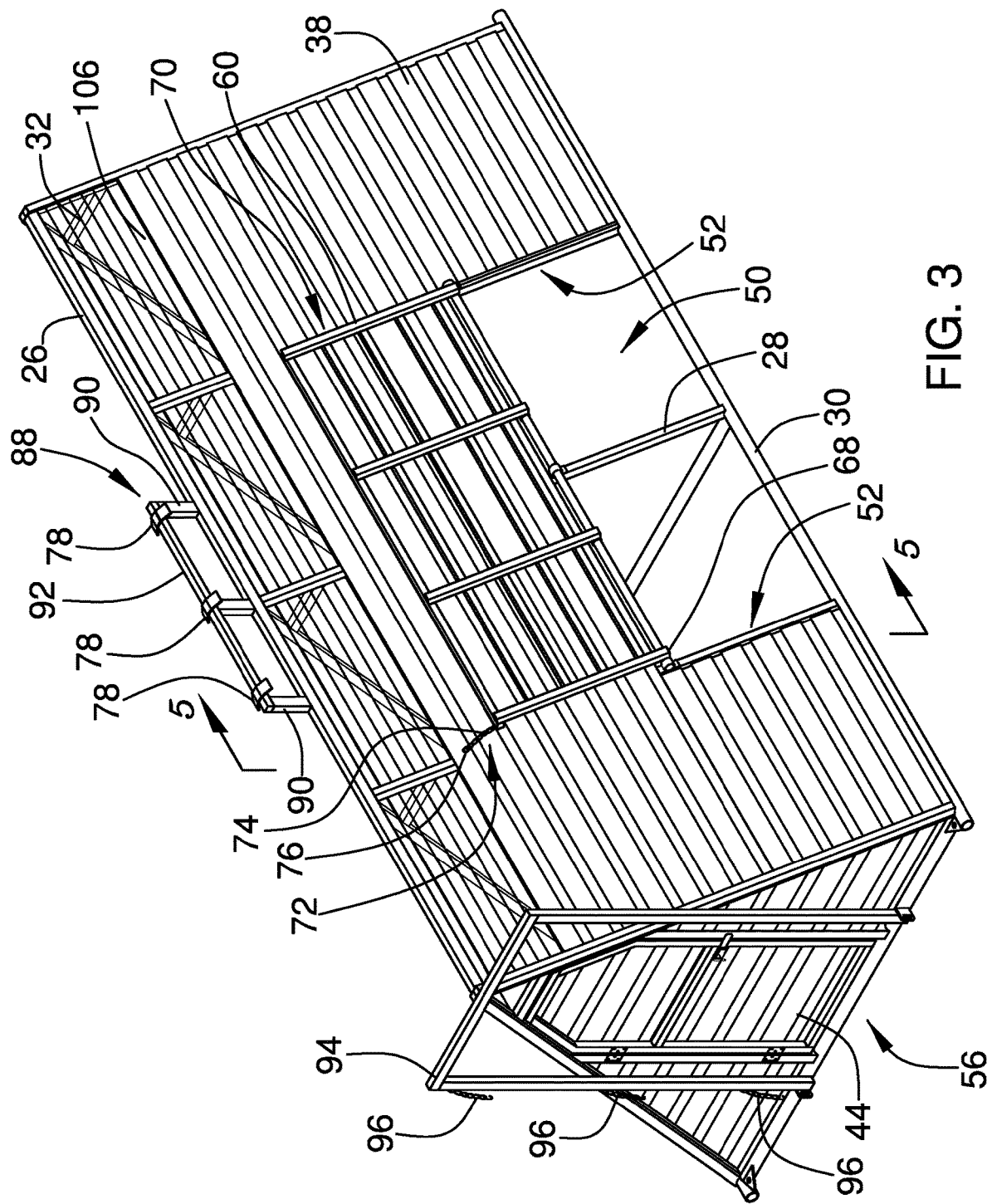
FIG. 3 is a top front side perspective view of an embodiment of the disclosure in an alternative position.
Figure 4:
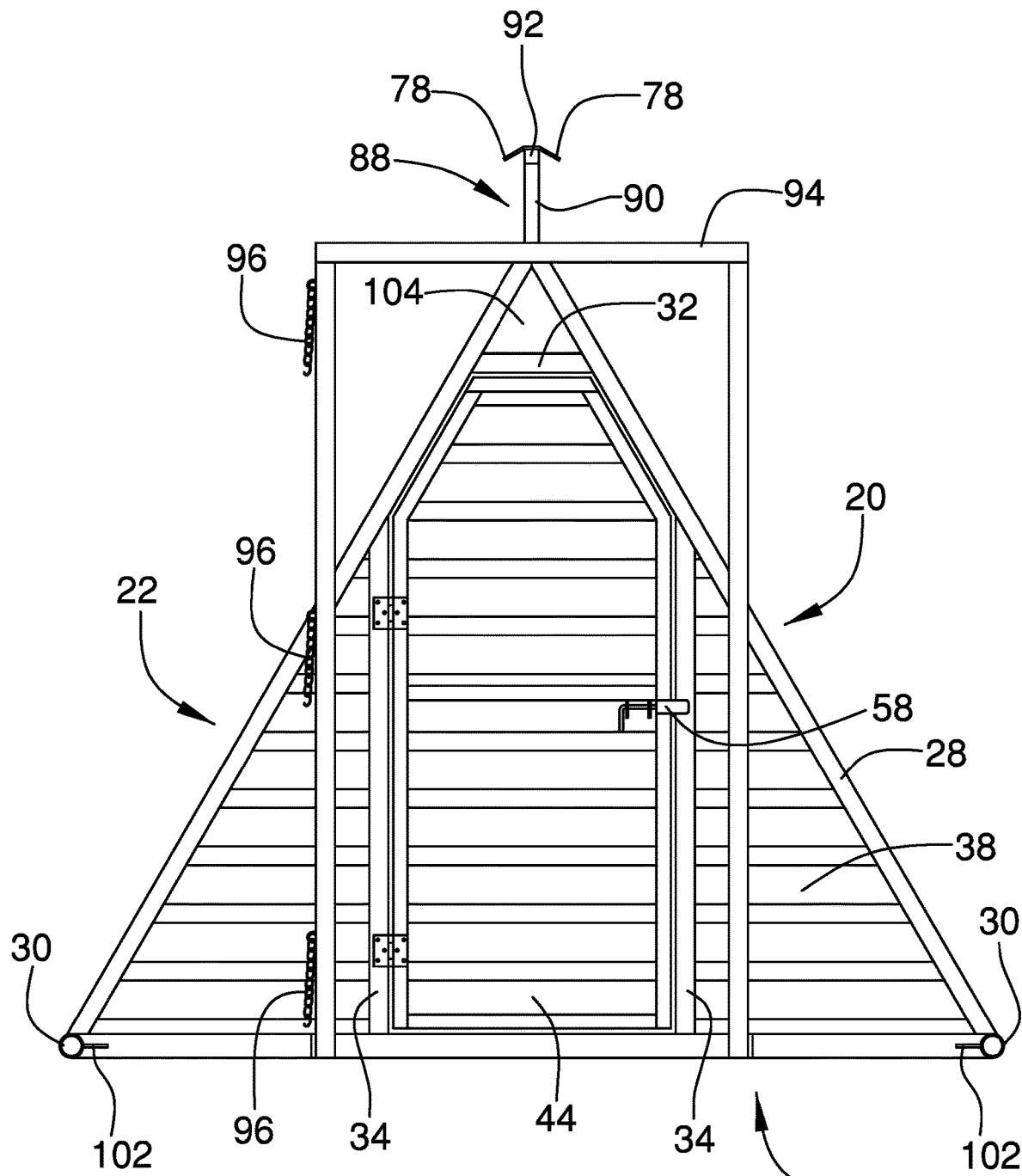
FIG. 4 is a front view of an embodiment of the disclosure.
Figure 5:
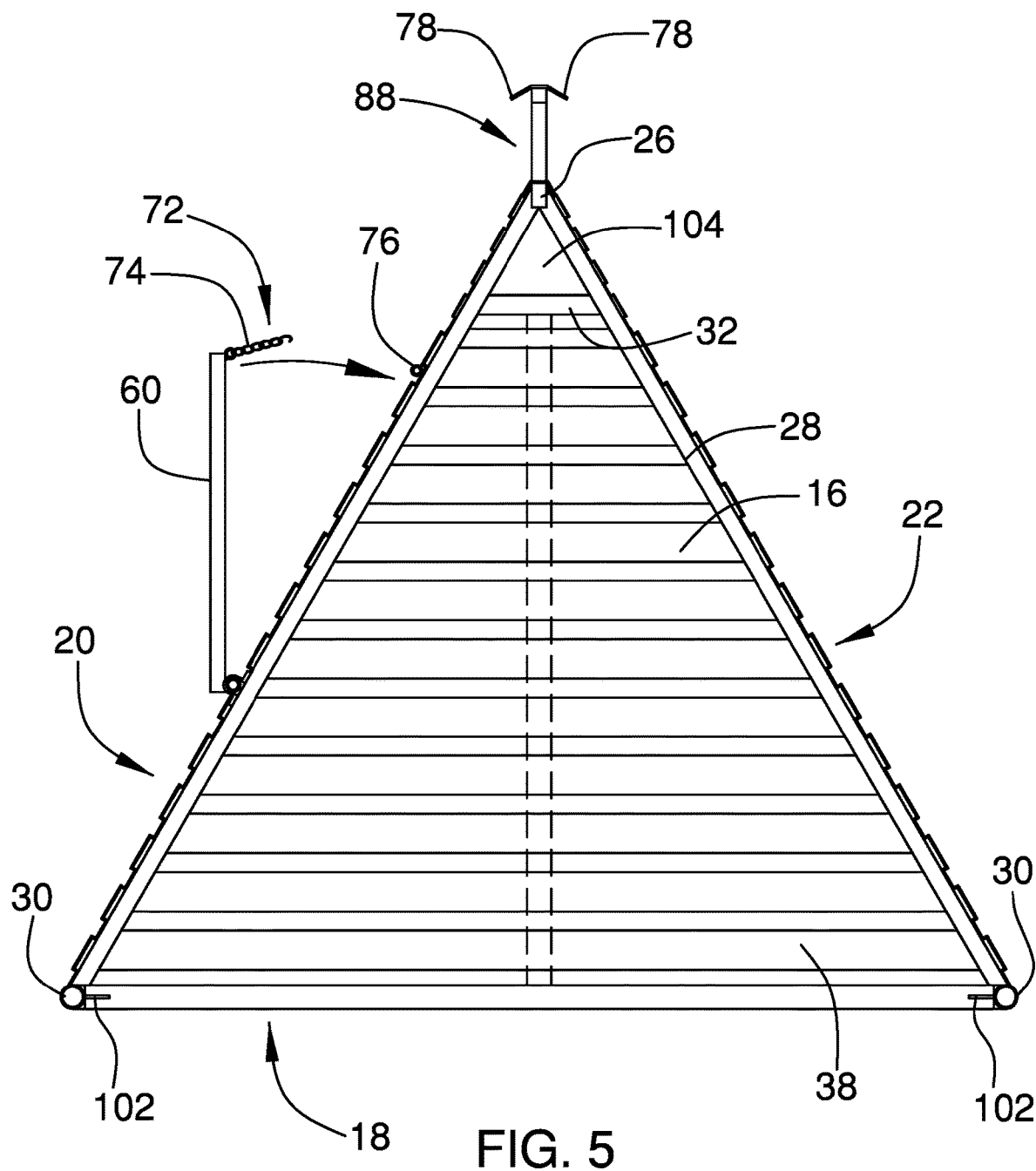
FIG. 5 is a cross-sectional view of an embodiment of the disclosure taken along line 5-5 of FIG. 3.

With reference now to the drawings, and in particular to FIGS. 1 through 5 thereof, a new shelter device embodying the principles and concepts of an embodiment of the disclosure and generally designated by the reference numeral 10 will be described.

As best illustrated in FIGS. 1 through 5, the portable windbreak shelter assembly 10 generally comprises a shelter frame 12. The shelter frame 12 has a front 14, a back 16, a bottom face 18, a first lateral side face 20, and a second lateral side face 22. The first lateral side face 20 and the second lateral side face 22 extend upwardly from respective opposite edges 24 of the bottom face 18 and meet to define an apex 26 of the shelter frame 12. The apex 26 extends between the front 14 and the back 16 of the shelter frame 12. The shelter frame 12 may be formed by a plurality of spaced triangular sections 28 and longitudinal members 30 forming a prism shape. Additional braces 32 may be provided in each of the triangular sections 28 near the apex 26. The shelter frame 12 has a plurality of door sections 34 positioned at the front 14 of the shelter frame 12. The door sections 34 define a door opening 36 through the front 14 of the shelter frame 12.

A covering 38 is coupled to the shelter frame 12 to inhibit wind from passing through the shelter frame 12. Thus, the shelter frame 12 and covering 38 define a sheltered interior space 40. The covering 38 extends from the bottom face 18 upwardly towards the apex 26. The bottom face 18 is left uncovered and open to the ground except for those portions of the triangular sections 28 extending across the bottom face 18. The covering 38 has top edges 42 on the front 14 and the back of said shelter frame 12 being spaced from the apex 26 defining a pair of top vents 104 into the shelter frame 12 wherein the sheltered interior space 40 is partially open to allow for venting and to prevent the sheltered interior space 40 from becoming too hot. A top portion 106 of the covering 38 adjacent to the apex 26 and extending along at least one or each of the first lateral side face 20 and the second lateral side face 22 is either transparent or translucent allowing light to enter into the sheltered interior space 40. The covering 38 has a front opening 46 positioned along the front 14 of the shelter frame 12 corresponding to and in alignment with the door opening 36. The front opening 46 extends upwardly from the bottom face 18 towards the apex 26. The covering 38 has a side opening 50 positioned along the first lateral side face 20 of the shelter frame 12. The side opening 50 extends upwardly from the bottom face 18 towards the apex 26. The shelter frame 12 has no more than one triangular section 28 being positioned to extend across the side opening 50. The side opening 50 may have opposite ends 52 positioned adjacent to respective triangular sections 28. The covering 38 may be comprised of conventional sheeting material.

A door 44 is pivotally coupled to the shelter frame 12 wherein the door 44 is pivotable between an open position 54 and a closed position 56. The door 44 is solid and covers the front opening 46 when in the closed position 56. The door 44 may be constructed of framing and sheeting material the same as used for the shelter frame 12 and covering 38. A door lock 58 of conventional design is coupled to the door 44 to selectively engage the shelter frame 12 wherein the door 44 is held in the closed position 56.

A gate 60 is coupled to the first lateral side face 20 of the shelter frame 12 in alignment with the side opening 50. The gate 60 includes an array of spaced elongated members 62 defining a grid 64 configured for allowing air to pass through the side opening 50 while inhibiting an animal from passing through the side opening 50 when the gate 60 is in a shut position 66 covering the side opening 50. A top 68 of the gate 60 is pivotally coupled to the first lateral side face 20 of the shelter frame 12 wherein the gate 60 is pivotable into an unshut position 70 relative to the side opening 50. A gate tether 72 is coupled to the gate 60. The gate tether 72 is securable to hold the gate 60 in the unshut position 70. The gate tether 72 may be a chain 74. A catch 76 is coupled to and extends from the covering 38 on the first lateral side face 20 of the shelter frame 12. The catch 76 may be secured to the shelter frame 12 through the covering 38. The chain 74 is engageable to the catch 76 wherein the gate 60 is held in the unshut position 70.

Each of a plurality of hooks 78 is coupled to the shelter frame 12. Each of the hooks 78 extends perpendicularly relative to the apex 26 of the shelter frame 12 wherein the hooks 78 are configured for being engaged by a lifting mechanism of a vehicle to lift and move the shelter frame 12. The lifting mechanism may be a bucket, boom arm, or the like operationally coupled to the vehicle, such as a tractor, truck, skidloader, or the like. Each of the hooks 78 is coupled to the shelter frame 12 such that the hooks 78 are spaced above the apex 26. Each of the hooks 78 may be formed by a plate 80 extending simultaneously downward towards the bottom face 18 of the shelter frame 12 and outwardly away from the apex 26. The plurality of hooks 78 is arranged into a plurality of aligned pairs 82. The hooks 78 of each of the aligned pairs 82 are equidistant from the front 14 of the shelter frame 12 and extend in opposite directions perpendicular to the apex 26. The plurality of aligned pairs 82 includes a pair of outermost pairs 84 and a medial pair 86 positioned between the outermost pairs 84. A support 88 is coupled to the shelter frame 12 to space the hooks 78 from the apex 26. The support 88 includes a pair of vertical posts 90 and a beam 92 coupled to and extending between the vertical posts 90. Each of the hooks 78 is coupled directly to and extends from the beam 92.

An outer frame 94 is coupled to the front 14 of the shelter frame 12. Each of a plurality of fasteners 96 is coupled to the outer frame 94 wherein the outer frame 94 is configured for coupling to a structure positioned adjacent to the outer frame 94 such as a building, corral section, windbreak panel, or the like.

To provide an alternative to lifting of the shelter frame 12, each of a a plurality of tow connection sites 98 is coupled to the shelter frame 12. Each of the tow connection sites 98 has an aperture 100 wherein the tow connection site 98 is configured for being engaged by a tow line to facilitate dragging of the shelter frame 12 by a vehicle pulling the tow line. The tow connection sites 98 may be formed by gussets 102 coupled to the shelter frame 12 along the bottom face 18.

In use, the assembly 10 is liftable by the hooks 78 or can be dragged using tow connection sites 98. The assembly 10 provides a windbreak and the sheltered interior space 40 when more than a simple windbreak may be desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable windbreak shelter assembly comprising:
    a shelter frame, said shelter frame having a front, a back, a bottom face, and a first lateral side face, and a second lateral side face, said first lateral side face and said second lateral side face extending upwardly from respective opposite edges of said bottom face and meeting to define an apex of said shelter frame extending between said front and said back; and
    a covering coupled to said shelter frame wherein said covering and said shelter frame are configured to inhibit wind from passing through said shelter frame to define a sheltered interior space;
    a hook coupled to said shelter frame, said hook extending from said shelter frame wherein said hook is configured for being engaged by a lifting mechanism of a vehicle to lift and move said shelter frame; and
    a gate coupled to said shelter frame, said gate comprising an array of spaced elongated members defining a grid configured for allowing air to pass through said gate while inhibiting an animal from passing through said shelter frame while said gate is in a shut position.

2. The assembly of claim 1, further comprising said covering extending from said bottom face upwardly towards said apex.

3. The assembly of claim 2, further comprising a top portion of said covering adjacent to said apex and extending along at least one of said first lateral side face and said second lateral side face being translucent.

4. The assembly of claim 1, further comprising said covering having top edges on said front and said back of said shelter frame being spaced from said apex defining a pair of top vents into said shelter frame.

5. The assembly of claim 1, further comprising said hook being one of a plurality of hooks coupled to said shelter frame, each of said hooks extending perpendicularly relative to said apex of said shelter frame wherein each of said hooks extends over said apex of said shelter frame and is configured for being engaged by a lifting mechanism of a vehicle to lift and move said shelter frame.

6. The assembly of claim 5, further comprising a support coupled to said shelter frame, said support comprising a pair of vertical posts and a beam coupled to and extending between said vertical posts, each of said hooks being coupled directly to and extending from said beam.

7. The assembly of claim 1, further comprising said covering having a side opening positioned along said first lateral side face of said shelter frame, said side opening extending upwardly from said bottom face towards said apex.

8. The assembly of claim 7, further comprising said shelter frame having a plurality of spaced triangular sections, no more than one of said sections being positioned to extend across said side opening.

9. A portable windbreak shelter assembly comprising:
a shelter frame, said shelter frame having a front, a back, a bottom face, and a first lateral side face, and a second lateral side face, said first lateral side face and said second lateral side face extending upwardly from respective opposite edges of said bottom face and meeting to define an apex of said shelter frame extending between said front and said back; and
a covering coupled to said shelter frame wherein said covering and said shelter frame are configured to inhibit wind from passing through said shelter frame to define a sheltered interior space, said covering having a side opening positioned along said first lateral side face of said shelter frame, said side opening extending upwardly from said bottom face towards said apex;
a hook coupled to said shelter frame, said hook extending from said shelter frame wherein said hook is configured for being engaged by a lifting mechanism of a vehicle to lift and move said shelter frame; and
a gate coupled to said first lateral side face of said shelter frame, said gate comprising an array of spaced elongated members defining a grid configured for allowing air to pass through said side opening while inhibiting an animal from passing through said side opening while said gate is in a shut position covering said side opening.

10. The assembly of claim 9, further comprising:
a top of said gate being pivotally coupled to said first lateral side face of said shelter frame wherein said gate is pivotable into an unshut position relative to said side opening; and
a gate tether coupled to said gate, said gate tether being securable to hold said gate in said unshut position.

11. The assembly of claim 10, further comprising:
a catch coupled to and extending from said covering on said first lateral side face of said shelter frame; and
said gate tether being a chain, said chain being engageable to said catch wherein said gate is held in said unshut position.

12. The assembly of claim 1, further comprising:
said shelter frame having a plurality of door sections positioned at said front of said shelter frame, said door sections defining a door opening through said front of said shelter frame; and
said covering having a front opening positioned along said front of said shelter frame corresponding to and in alignment with said door opening, said front opening extending upwardly from said bottom face towards said apex.

13. The assembly of claim 12, further comprising a door coupled pivotally coupled to said shelter frame wherein said door is pivotable between an open position and a closed position, said door being solid and covering said front opening when in said closed position.

14. The assembly of claim 13, further comprising a door lock coupled to said door, said door lock selectively engaging said frame wherein said door is held in said closed position.

15. A portable windbreak shelter assembly comprising:
a shelter frame, said shelter frame having a front, a back, a bottom face, and a first lateral side face, and a second lateral side face, said first lateral side face and said second lateral side face extending upwardly from respective opposite edges of said bottom face and meeting to define an apex of said shelter frame extending between said front and said back; and
a covering coupled to said shelter frame wherein said covering and said shelter frame are configured to inhibit wind from passing through said shelter frame to define a sheltered interior space;
a hook coupled to said shelter frame, said hook extending from said shelter frame wherein said hook is configured for being engaged by a lifting mechanism of a vehicle to lift and move said shelter frame;
an outer frame coupled to said front of said shelter frame; and
a plurality of fasteners coupled to said outer frame wherein said outer frame is configured for coupling to a structure positioned adjacent to said outer frame.

16. The assembly of claim 1, further comprising a plurality of tow connection sites coupled to said frame, each of said tow connection sites having an aperture wherein said tow connection site is configured for being engaged by a tow line to facilitate dragging of said shelter frame by a vehicle pulling the tow line.

17. The assembly of claim 1, further comprising a door coupled pivotally coupled to said shelter frame wherein said door is pivotable between an open position and a closed position.

18. The assembly of claim 1, further comprising:
said covering extending from said bottom face upwardly towards said apex; and a top portion of said covering adjacent to said apex being translucent.

* * * * *